(12) United States Patent  
Chen

(10) Patent No.: US 10,864,843 B2
(45) Date of Patent: Dec. 15, 2020

(54) COVER FOR MOTOR VEHICLE OR LUGGAGE ON A MOTOR VEHICLE

(71) Applicant: David Chen, Milford, CT (US)

(72) Inventor: David Chen, Milford, CT (US)

( * ) Notice: Subject to any disclaimer, the term of this patent is extended or adjusted under 35 U.S.C. 154(b) by 13 days.

(21) Appl. No.: 16/298,180

(22) Filed: Mar. 11, 2019

(65) Prior Publication Data

US 2020/0290500 A1 Sep. 17, 2020

(51) Int. Cl.
*B60P 7/04* (2006.01)
*B60P 7/08* (2006.01)
*B60J 11/04* (2006.01)
*A45C 13/00* (2006.01)

(52) U.S. Cl.
CPC .......... *B60P 7/0876* (2013.01); *A45C 13/002* (2013.01); *B60J 11/04* (2013.01)

(58) Field of Classification Search
CPC ....... B60R 9/055; B60R 9/048; B60P 7/0876; B60P 7/04; A45C 13/002; B60J 11/04
See application file for complete search history.

(56) References Cited

U.S. PATENT DOCUMENTS

| | | | | |
|---|---|---|---|---|
| 2,454,608 A * | 11/1948 | Meyerdick | ............. | B60R 9/048 224/486 |
| 3,000,418 A * | 9/1961 | Bitting | ................... | B60R 9/055 180/53.8 |
| 3,955,732 A * | 5/1976 | Boschen | ............... | B60P 7/0876 224/328 |
| 5,096,107 A * | 3/1992 | VanSon | ................... | B60R 9/055 224/309 |
| 5,538,169 A * | 7/1996 | Moore | ................... | A45C 15/00 190/109 |
| 6,257,470 B1 * | 7/2001 | Schaefer | ................. | B60R 9/055 224/318 |
| 6,892,912 B1 * | 5/2005 | MacNeil | ................. | B60R 9/055 224/318 |
| 2001/0019689 A1 * | 9/2001 | Christensen | ............. | B60P 3/40 410/100 |
| 2003/0205598 A1 * | 11/2003 | Eichele | ................... | B60R 9/045 224/328 |

* cited by examiner

*Primary Examiner* — Corey N Skurdal
(74) *Attorney, Agent, or Firm* — IP Attorneys Group, LLC

(57) ABSTRACT

A cover for covering a car or luggage on top of a car is described. The cover is made of a stretchy material such that it can expand to tightly fit the size and shape of a large variety of items or vehicles. Thus, the material composition as well as cover layers are crucial in obtaining the optimal balance of flexibility and protection. In many embodiments securing mechanisms are provided around the base of the cover as well as over the top of the cover to aid in securing the cover over the items or vehicle. In some embodiments a lower cover is provided which sits under items on top of a vehicle and protects the roof of the vehicle from the items.

20 Claims, 2 Drawing Sheets

COVER FOR MOTOR VEHICLE OR LUGGAGE ON A MOTOR VEHICLE

BACKGROUND OF THE INVENTION

This invention relates to a cover placed on a motor vehicle or over luggage or other items carried outside of a motor vehicle as a means of protecting the items.

Often when traveling, especially with larger families or for longer trips, more luggage or other items need to be packed and transported than there is space in the trunk of the motor vehicle. Typically people address this situation by tying items to the exterior of the motor vehicle, often on top of the roof or trunk. If uncovered, these items are exposed to the elements when driving, such as rain or snow, which can damage the items. Additionally, unless all of the items are perfectly even, small pockets of air can get trapped between the items reducing the aerodynamic nature of the motor vehicle which can reduce efficiency and decrease the gas mileage of the motor vehicle.

In order to protect the items from the elements, people have used tarps or canvases as a means of covering the items. These covers are often tied down with straps, ropes, or other similar means in order to secure the items and keep the cover from blowing off of the vehicle during travel. However, these covers often do not fit well around the items, thus rain or other precipitation can still enter through gaps. Additionally, wind can get caught in the gaps in the front of the cover and cause a "sail effect" as the cover traps the wind. This "sail effect" can significantly decrease the aerodynamic nature of the vehicle.

Some have tried to address the limitations regarding the protection from precipitation of these covers by using waterproof material which can protect the items from precipitation. However, often these waterproof covers still do not fit well to the form of the items and can cause drag with the capture of wind in the different folds or excess material. To address this aerodynamic issue, individuals often use a number of ties or other material to closely pack the cover around the items. However, this process is time consuming, requires significant effort in securing and then removing the covering, and requires the user to have a significant number of ties at their disposal which then must either be discarded or stored at the location where they arrived.

Typically luggage covers for motor vehicles are a single sized, often rectangular sheet, which also limits the versatility for different sized luggage, and can be large and unwieldy for storage as the sheet needs to be large enough to fit over the length and width of the vehicle while also bulging up over the items.

Many of the covers are made of a thin material which can easily be cut, which reduces the safety of the items stored under the cover as thieves can simply cut the covering and steal items under the cover.

Similarly, covers for the entire vehicle which are not form fitting and durable can cause the vehicle to get scratched, can trap water inside of the cover which corrodes the metal of the vehicle, or can let sunlight in certain areas which would bleach the color of the car unevenly.

Thus, what is needed is a cover for a motor vehicle which is made of a stretchable and ideally waterproof material which can stretch over the vehicle or luggage and conform to whatever shape it is covering such that it reduces wind resistance and seals any gaps where wind or precipitation may enter. Having a stretchable material would allow for a smaller size when storing and would allow the cover to fit a larger variety of shapes. Ideally, this cover would also have straps or other materials needed to secure the cover included such that these materials can be easily stored, and would also have protective abilities against knives or other sharp objects.

SUMMARY OF THE INVENTION

The current invention relates to a cover for a motor vehicle or for items placed outside of a motor vehicle. In some embodiments the cover includes a material cover made of a stretchable material which further comprises a base securing mechanism and a top securing mechanism.

In some embodiments the top securing mechanism comprises one or more hooks, loops, or other means for securing the cover to the vehicle. In some embodiments a winch is provided on the top securing mechanism to help tighten and secure the cover. In some embodiments the top securing mechanism is strapped longitudinally, in other embodiments latitudinally, and in other embodiments both longitudinally and latitudinally. In some embodiments the top securing mechanism is removable and in others it is not able to be removed.

In some embodiments the base securing mechanism is affixed to the outer perimeter of the material cover by the group consisting of insertion in a material pocket, threading through eyelets fastened to the outer perimeter of the material cover, directly sewing to said outer perimeter, or combinations thereof.

In some embodiments the material cover is made up of at least 5% stretchable material such as spandex, nylon, rubber, neoprene, latex, similar polymer based materials, or combinations thereof. In some embodiments more than one material cover is provided. In some embodiments with more than one material cover, the top and bottom of the material covers are equipped with mating fastener areas, the top of the material covers comprising one side of the fastener unit and the bottom of the material covers comprising the mating side of the fastener unit such that multiple material covers can be fastened together to make one larger vehicle cover.

In some embodiments the material cover is made up of multiple layers. In some embodiments the layers are joined together and in other embodiments they are separate. In some embodiments with separate layers the layers comprise matching mating areas so that the layers can be fastened together. In some embodiments the layers are made of the same material composition and in others they are made of different materials. In some embodiments the lower layer is made up of a material which is resistant to sharp objects.

In some embodiments a lower layer which fits underneath the items outside of a motor vehicle is provided to protect the outer surface of the motor vehicle from the items. In some embodiments the material cover and lower layer are made of the same material composition and in others they are made of different materials. In some embodiments the lower layer and the material cover comprise matching mating areas so that they can be fastened together. In some embodiments the material cover further comprises a material flap which covers the seam created by the fastening of the lower layer and material cover.

In some embodiments the cover is at least 5 feet long. In other embodiment the cover is less than 5 feet, in another embodiment 5-10 feet and in another embodiments more than 10 feet.

DETAILED DESCRIPTION OF THE INVENTION

Figure 1:
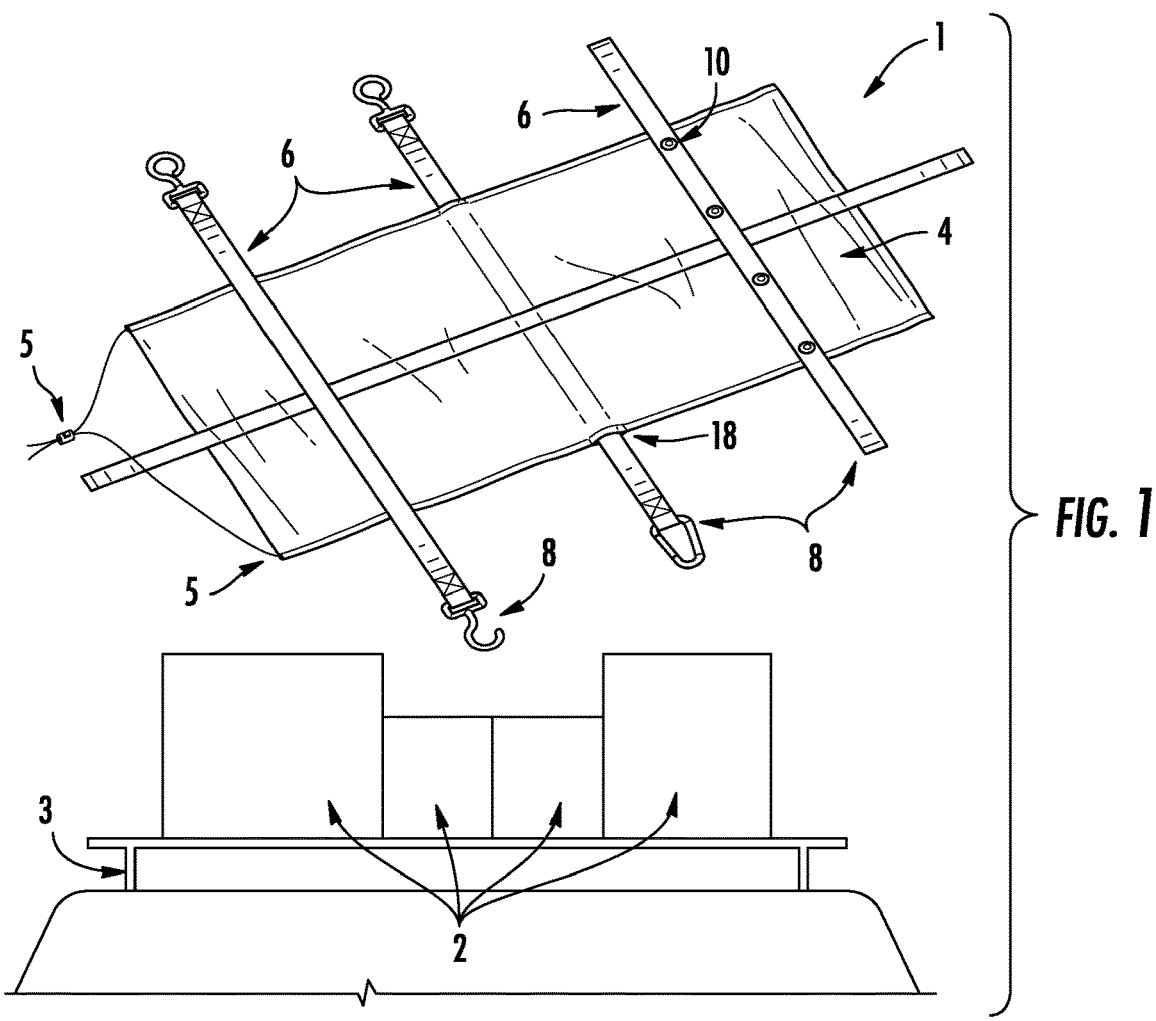
FIG. 1 depicts a side view of a cover for a motor vehicle or luggage in accordance with the current invention which is in the process of being placed overtop of items on a vehicle.
Figure 2:
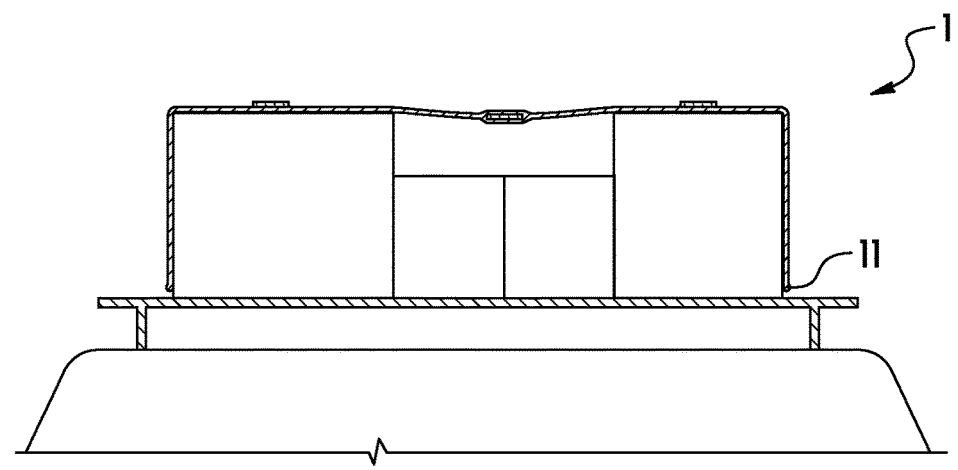
FIG. 2 depicts a cross-sectional view of the cover for a motor vehicle or luggage from FIG. 1 which is fully covering and affixed to the vehicle.
Figure 3:
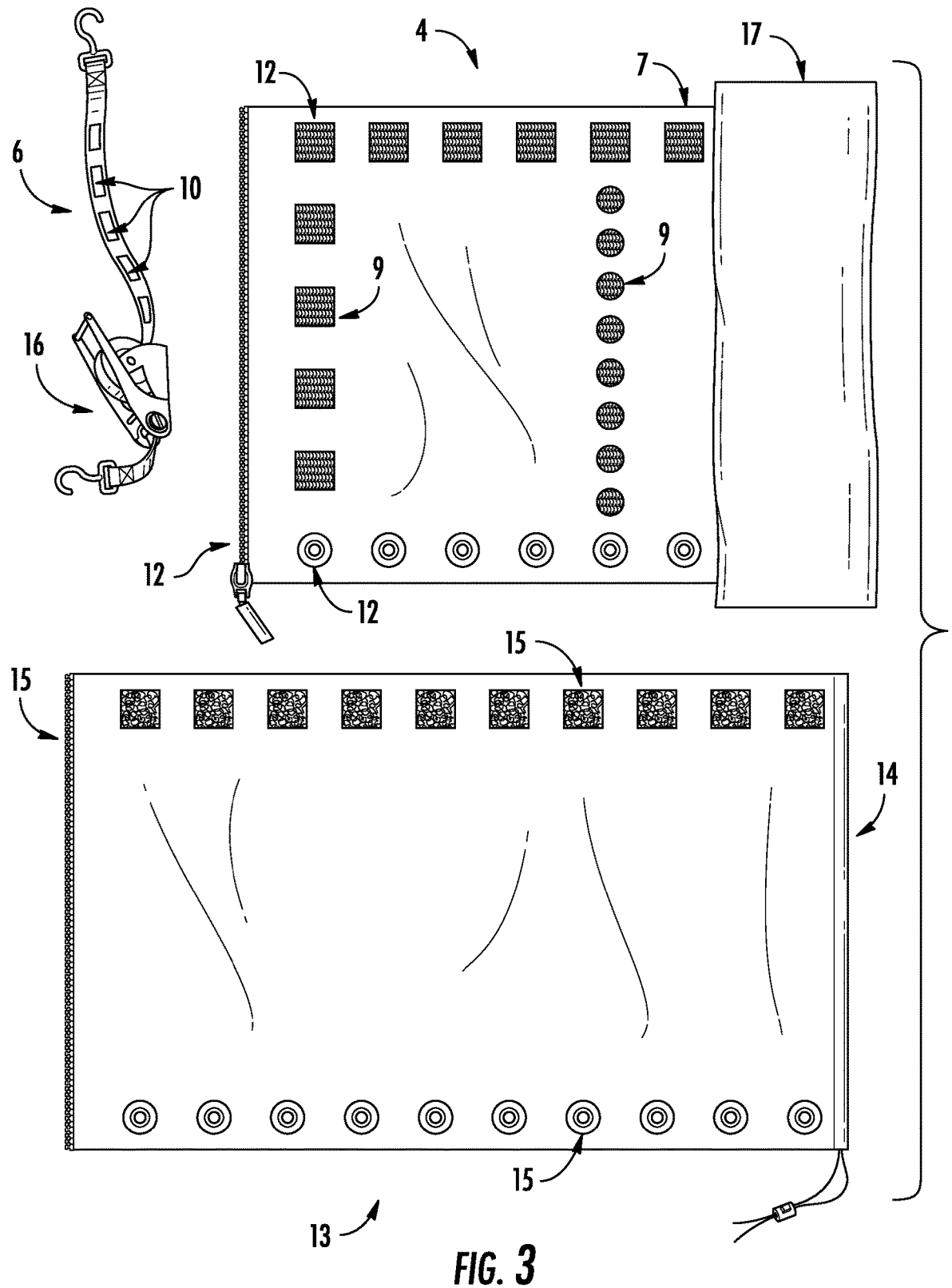
FIG. 3 depicts a view of the cover for a motor vehicle or luggage from FIG. 1 including additional pieces included in some embodiments of the invention.

FIG. 1 shows a cover (1) for a motor vehicle or luggage which is extending over items (2) on top of a motor vehicle's roof rack (3). In most embodiments cover 1 comprises three main components, the material cover itself (4), a base securing mechanism (5), and at least one top securing mechanism (6). All of these components will be discussed in more detail below. As seen in FIG. 1, in many embodiments cover 1 is made of a stretchable material such that it starts off having a smaller base area than the items or vehicle which are being covered, and then stretches to tightly cover the items or vehicle fully as in FIG. 2.

In some embodiments a base securing mechanism (5) is provided around the entire outer perimeter (7) of the material cover 4. Base securing mechanism 5 helps cover 1 tighten around the base of the items or vehicles such that precipitation and wind do not penetrate the cover. In many embodiments base securing mechanism 5 is designed such that it can expand and contract with the expansion and contraction of material cover 4. In some embodiments base securing mechanism 5 is a drawstring. In some embodiments where base securing mechanism 5 is a drawstring the drawstring is threaded inside of a pocket in the outer perimeter 7 of material cover 4. In some embodiments where base securing mechanism 5 is a drawstring, the drawstring is threaded in eyelets fastened to the outer perimeter 7 of material cover 4. In other embodiments, base securing mechanism 5 is an elastic band secured around the outer perimeter 7. In some embodiments no base securing mechanism 5 is provided, and the tightness of cover 1 around the base of the items is efficiently provided by material cover 4 and/or top securing mechanism 6.

In most embodiments at least one top securing mechanism 6 is provided as a means of securing cover 1 to the motor vehicle such that it does not dislodge during transport. In some embodiments only one top securing mechanism 6 is provided and in other embodiments multiple top securing mechanisms 6 are provided. In most embodiments top securing mechanism 6 is a strap which extend longitudinally or latitudinally across material cover 4. For the purposes of this patent latitudinally refers to the length of the motor vehicle extending from the front to the back, and longitudinally refers to the width of the motor vehicle extending from the right to left side.

In most embodiments the end of top securing mechanism 6 is equipped with a fastening mechanism 8. In some embodiments fastening mechanism 8 is on both free ends of top securing mechanism 6, and in other only on one end of top securing mechanism 6. In some embodiments fastening mechanism 8 is a hook which can hook onto car roof racks 3, inside of a window, or to the other side of top securing mechanism 6. The hook shape and style is varied in different embodiments and are selected from the group consisting of simple hook, carabiner hook, snap hook, "s" hook, swivel hook, hook eye, or combinations thereof. In other embodiments no hook is provided and fastening mechanism 8 is simply the end of top securing mechanism 6 which can be tied into a knot or other similar fastening means. In some embodiments the end of top securing mechanism 6 is shaped into a loop such that a hook can engage with the loop. In some embodiments a winch (16) is provided on top securing mechanism 6 such that when the ends of top securing mechanism 6 are connected together or to the motor vehicle winch 16 can be used to tighten top securing mechanism around the items or vehicle.

In some embodiments, top securing mechanism 6 is affixed to material cover 4. These embodiments are useful as they allow for easy storage and limit the possibility of top securing mechanism 6 being lost when not in use. In some of these embodiments, top securing mechanism 6 is made of a flexible material. In other embodiments top securing mechanism 6 is made of a more sturdy material and placed within a pocket (18) of material cover 4 such that the stretching of material cover 4 is not inhibited by a less flexible top securing mechanism 6. In other embodiments, top securing mechanism 6 is removable. This aids in the ability of material cover 4 to be optimally flexible, not limiting the flexibility with affixed and less flexible top securing mechanism 6. In some removable embodiments, top securing mechanism 6 is a separate piece, and does not affix to material cover 4, and in other embodiments top securing mechanism 6 affixes to material cover 4. In one such affixing embodiment, material cover 4 is equipped with a number of mating areas (9) which mate with similar mating areas (10) on top securing mechanism 6. The mating areas are selected from the group consisting of zipper, button, hook and loop, or combinations thereof.

In some embodiments, material cover 4 is made of a stretchy, flexible material. Examples of stretchy, flexible material in accordance with this invention include spandex, nylon, rubber, neoprene, latex, similar polymer based materials, or combinations thereof. In some embodiments material cover 4 is made up of only one type of material. These embodiments are useful for ease and cost of construction. In some embodiments material cover 4 is made up of a mixture of different types of material, such as a mixture of stretchy and durable materials. In other embodiments the stretchy, flexible material is mixed with common fabric, including cotton, polyester, satin, or denim, or combinations thereof. In some embodiments the fabrics used are waterproof. In some embodiments the fabrics are naturally waterproof due to their material, such as rubber, and in other embodiments the fabrics have been modified to be waterproof, such as polyurethane coated polyester.

In embodiments with mixed fabrics, the amount of stretchy, to durable, to common fabrics is essential to have an efficient blend of flexibility, durability, and cost. In some embodiments less than 15% spandex, or other similar material as defined above is used in combination with other fabrics. This gives an adequate amount of flexibility while focusing on the costs and durability. In other embodiments 15-30% spandex, or other similar material as defined above is used in combination with other fabrics, in others 31-70% spandex, or other similar material as defined above, and in others 71-100% spandex, or other similar material as defined above. Each of these ranges give optimal characteristics which are all needed in different situations. Embodiments with 71-100% spandex are essential when significant flexibility is required. However, the cost and durability for these covers would be less, thus, these covers are ideal for customers who do not use vehicles covers often, but when they do the cover is required to cover drastically different shapes or sizes. On the other end, embodiments with less then 15% spandex are ideal for customers which use a cover often for the same or similar shapes as the cover, as these covers would be significantly more durable but less flexible. The two intermediary rages are important for giving a mixture of flexibility and durability while also keeping material costs low.

In some embodiments material cover 4 is made up of one layer 11, and in other embodiments material cover 4 is made up of multiple layers 11. In some embodiments with multiple layers each layer 11 is made up of the same material composition, and in others layers 11 are made of different material compositions. In some embodiments layers 11 are connected and in others layers 11 are separate. Having multiple layers is important as it allows greater durability as well as a greater range of what cover 1 can encapsulate. In some embodiments the inner layer is a harder plastic dome which covers items 2 and gives a smooth aerodynamic surface which the external layer can cover. Hard plastics also give the added benefit of being resistant to knives or other sharp objects. In other embodiments, knife resistant fabric such as Cordura®, Coolmax®, Gore-Tex®, LIQUIDARMOR™, or Kevlar® are used as an inside layer. These materials have the combined benefits of flexibly and protection. In some embodiments, the inside layer is specifically designed to be waterproof such that the outer layer can be flexible but is not required to be fully waterproof.

In some embodiments, the outer perimeter 7 of material layer 4 is equipped with mating areas 12. The mating areas are selected from the group consisting of zipper, button, hook and loop, or combinations thereof. In some embodiments with separate layers 11 the separate layers are also equipped with matching mating areas such that the layers of material cover 4 can join together around outer perimeter 7.

In some embodiments, multiple material cover 4's are provided, each with both sides of mating areas 12 such that they can mate together and make a larger single cover 1. In these embodiments the lower surface of material cover 4 comprises one end of mating area 12 and the upper surface of material cover 4 comprises the matching end of mating area 12. These embodiments are important for diversely shaped items which may be significantly longer or wider than the typical roof shape and size.

Depending on the embodiment, cover 1 approximates the shape of a rectangle, square, triangle, or circle. Different embodiments also consist of varying sizes. In one embodiment the length of cover 1 is less than 5 feet, in another embodiment 5-10 feet and in another embodiments more than 10 feet. These different shapes and sizes are important as different cars will have varying sizes and shapes, and the items 2 which are being covered consist of different sizes and shapes. Thus, while cover 1 as described in this invention does have the ability to significantly stretch and match the shape of a wide variety of items or areas, starting with a more adequately fitting cover is ideal. For example, someone trying to cover a 2018 Smart for two vehicle, or items on top of a 2018 Smart for two vehicle, whose total length is only 106 inches would want to start with a significantly smaller cover 1 than someone trying to cover a 2018 Honda Odyssey, or items on top of a 2018 Honda Odyssey, whose total length is almost double at 203 inches.

In some embodiments, a lower layer 13 is additionally provided as part of cover 1. Lower layer 13 is designed to rest underneath items 2. Lower layer 13 is provided as a means of protecting the roof paint on the vehicle from items 2. In some embodiments lower layer 13 is the same material composition as material cover 4, and in other embodiments lower layer 13 is a different material composition. Embodiments where lower layer 13 and material cover 4 are the same material are useful for having a unified and aesthetically pleasing cover, as well as reducing the different materials needed to be purchased and stored for construction. However, as the functions of lower layer 13 and material cover 4 are different, in many embodiments lower layer 13 is better suited to be constructed out of a more durable and less stretchy material than material cover 4.

In some embodiments lower layer 13 is equipped with a base securing mechanism around the entire outer perimeter 14. As with material cover 4 the base securing mechanism for lower layer 13 is chosen from the group comprising a drawstring in a pocket around outer perimeter 14, a drawstring threaded though eyelets, or an elastic band. In many embodiments lower layer 13 is equipped with mating areas 15 on outer perimeter 14. The mating areas are selected from the group consisting of zipper, button, hook and loop, or combinations thereof. Mating areas 15 are provided to mate with mating areas 12 on material cover 4 such that cover 1 achieves better all around protection from precipitation and wind. In some embodiments material cover 4 is provided with an extra flap of material (17) which covers the seam between material cover 4 and lower layer 13 in order to even more optimally protect against precipitation and wind. As discussed above, in different embodiments lower layer 13 has different sizes and shapes such that it more optimally matches the rest of cover 1, namely material cover 4. In some embodiments at least one side of lower layer 13 and material cover 4 are joined.

In some embodiments where at least one side is joined, lower layer 13 and material cover 4 are separate pieces which are sewn together. In other embodiments lower layer 13 and material cover 4 are simply made of one continuous piece.

In some embodiments cover 1 is used to cover the entirety of the car rather than simply luggage on the outside of a car.

While the present invention has been particularly described, it is evident that many alternatives, modifications and variations will be apparent to those skilled in the art in light of the foregoing description. These descriptions and drawings are exemplary of specific embodiments only and are not intended to be limiting to the scope of the invention defined in the claims. It is therefore contemplated that the claims will embrace any such alternatives, modifications, and variations as falling within the true scope and spirit of the present invention.

What is claimed is:

1. A cover for a motor vehicle comprising:
   at least one material cover made of a mixture of a stretchable material and
   a generally durable material different from said stretchable material;
   wherein said stretchable material makes up at least 15% of said cover;
   wherein said material cover comprises an outside perimeter;
   at least one base securing mechanism along said outside perimeter;
   at least one top securing mechanism.

2. The cover for a motor vehicle according to claim 1 wherein said top securing mechanism further comprises a fastening mechanism comprising the group consisting of simple hook, carabiner hook, snap hook, "s" hook, swivel hook, hook eye, or combinations thereof.

3. The cover for a motor vehicle according to claim 1 wherein at least one of said top securing mechanisms is used in a longitudinal direction.

4. The cover for a motor vehicle according to claim 1 wherein at least one of said top securing mechanisms is used in a longitudinal direction and at least one of said top securing mechanisms is used in a latitudinal direction.

5. The cover for a motor vehicle according to claim 1 wherein said material cover and said top securing mechanism are separate and have mating fastener areas which affix said material cover and said top securing mechanism together, and which are chosen from the group consisting of zipper, button, hook and loop, or combinations thereof.

6. The cover for a motor vehicle according to claim 1 wherein said top securing mechanism further comprises a winch to tighten said base securing mechanism.

7. The cover for a motor vehicle according to claim 1 wherein said base securing mechanism is chosen from the group consisting of an elastic band, a drawstring, or combinations thereof.

8. The cover for a motor vehicle according to claim 1 wherein said base securing mechanism is affixed to said outer perimeter of said material cover by the group consisting of insertion in a material pocket, threading through eyelets fastened to said outer perimeter, directly sewing to said outer perimeter, or combinations thereof.

9. The cover for a motor vehicle according to claim 1 wherein said material cover is made up of at least 50% stretchable material.

10. The cover for a motor vehicle according to claim 1, further comprising at least two material covers, wherein said material covers comprise an upper and lower surface, each surface comprising mating fastener areas, wherein said upper surface comprises one end of said mating fastener area, and said lower surface comprises the opposing end of said mating fastener area, such that multiple material covers can affix together.

11. A cover for a motor vehicle comprising:
at least one material cover further comprising at least a first and second layer;
wherein said material cover comprises an outside perimeter;
at least one base securing mechanism along said outside perimeter;
at least one top securing mechanism separate from said material cover;
at least one cover mating mechanism on said material cover;
at least one top mating mechanism on said top securing mechanism;
wherein said cover mating mechanism and said top mating mechanism reversibly affix to one another.

12. A cover for a motor vehicle according to claim 11 wherein said first and second layers are separate.

13. A cover for a motor vehicle according to claim 12 wherein said first and second layers each comprise mating fastener areas which affix said first and second layers together, and which are chosen from the group consisting of zipper, button, hook and loop, or combinations thereof.

14. A cover for a motor vehicle according to claim 11 wherein said first and second layers are materially distinct.

15. A cover for a motor vehicle according to claim 11 further comprising an outside and an inside, wherein said first layer is on said outside and is made of a stretchable material, and wherein said second layer is on said inside and is made from a material which is resistant to cutting with a knife or similarly sharp object.

16. A cover for a motor vehicle according to claim 11 wherein said material cover is at least 5 feet long.

17. A cover for a motor vehicle comprising:
at least one material cover made of a stretchable material;
wherein said material cover comprises an outside perimeter;
at least one base securing mechanism along said outside perimeter;
at least one top securing mechanism;
a material lower layer separate from said material cover;
wherein said material lower layer further comprises a lower layer outside perimeter;
at least one lower layer securing mechanism, different than said base securing mechanism, along said lower layer outside perimeter;
wherein said lower layer outside perimeter is generally larger than said outside perimeter.

18. A cover for a motor vehicle according to claim 17 wherein said lower layer and said material cover are materially distinct.

19. A cover for a motor vehicle according to claim 17 wherein said material cover and said material lower layer each comprise mating fastener areas which affix said material cover and said material lower layer together;
wherein said mating fastener areas are located around said lower layer outside perimeter and said outside perimeter;
wherein said mating fastener areas are chosen from the group consisting of zipper, button, hook and loop, or combinations thereof.

20. A cover for a motor vehicle according to claim 19 wherein said material cover further comprises a material flap which covers a seam made by the affixing of said material cover and said material lower layer together.

* * * * *